United States Patent
Emery

(10) Patent No.: US 12,242,368 B2
(45) Date of Patent: Mar. 4, 2025

(54) UNIQUE SIGNPOST STRINGS FOR AUTOMATION TASK NAMES TO DIRECTLY CORRELATE TASK OUTPUTS TO SPECIFIC FILES AND ORIGINATING LINES OF SOURCE CODE

(71) Applicant: Bank of America Corporation, Charlotte, NC (US)

(72) Inventor: Charles Emery, Hainesport, NJ (US)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 18/130,053

(22) Filed: Apr. 3, 2023

(65) Prior Publication Data

US 2024/0330147 A1 Oct. 3, 2024

(51) Int. Cl.
G06F 11/36 (2006.01)
G06F 11/3604 (2025.01)

(52) U.S. Cl.
CPC ...... *G06F 11/3612* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 7,761,863 | B2 | 7/2010 | Illowsky et al. |
| 7,974,714 | B2 | 7/2011 | Hoffberg |
| 8,055,913 | B2 | 11/2011 | Ginter et al. |
| 8,073,839 | B2 | 12/2011 | Rathod |
| 8,112,625 | B2 | 2/2012 | Ginter et al. |
| 8,249,907 | B2 | 8/2012 | Blagg et al. |
| 8,468,244 | B2 | 6/2013 | Redlich et al. |
| 8,566,115 | B2 | 10/2013 | Moore |
| 8,918,488 | B2 | 12/2014 | Umbehocker |
| 8,984,331 | B2 | 3/2015 | Quinn |
| 9,064,414 | B2 | 6/2015 | Nerayoff et al. |
| 9,094,434 | B2 | 7/2015 | Williams et al. |
| 9,141,382 | B2 | 9/2015 | Heyhoe et al. |
| 9,280,757 | B2 | 3/2016 | Parpia et al. |
| 9,753,703 | B2 | 9/2017 | Jemiolo |
| 9,753,767 | B2 | 9/2017 | Rausch et al. |
| 9,864,958 | B2 | 1/2018 | Barnes, Jr. |

(Continued)

*Primary Examiner* — Lewis A Bullock, Jr.
*Assistant Examiner* — Mark A Gooray
(74) *Attorney, Agent, or Firm* — Banner & Witcoff, Ltd.

(57) ABSTRACT

Automation methods of utilizing signposts assigned to automation tasks in order to correlate automation output with lines of automation source code are disclosed. Automation job(s) are identified/detected (manually or automatically), and then processed. Tasks in the job are identified and unique identifiers (e.g., signposts in and to the source code) are assigned for each task and inserted into the source code. The unique identifiers may include task numbers, code directory identifiers, nested file identifiers, and/or standalone file identifiers, or a hexadecimal alias may be used as the identifier. Job task indicia can be stored in memory with the associated unique identifiers. If a job failure is detected during execution, a log identifying the signpost at which the fault occurred can be generated. This facilitates debugging and troubleshooting, because lines of automation output are correlated with lines of automation code.

15 Claims, 8 Drawing Sheets

(56) References Cited

U.S. PATENT DOCUMENTS

| | | |
|---|---|---|
| 9,886,956 B1 | 2/2018 | Antunes et al. |
| 9,940,190 B2 | 4/2018 | Hooks |
| 9,996,315 B2 | 6/2018 | Barnes, Jr. |
| 10,331,495 B2 | 6/2019 | Bequet et al. |
| 10,360,069 B2 | 7/2019 | Bequet et al. |
| 10,423,948 B1 | 9/2019 | Wilson et al. |
| 10,868,711 B2 | 12/2020 | Chor |
| 11,113,137 B2* | 9/2021 | Gaida .................... G06N 20/00 |
| 11,180,069 B2 | 11/2021 | Jarvis et al. |
| 11,398,147 B2 | 7/2022 | Cohn et al. |
| 2009/0037884 A1* | 2/2009 | Benameur ........... G06F 11/3608 717/126 |
| 2010/0121668 A1 | 5/2010 | Hohmann |
| 2012/0159444 A1* | 6/2012 | Agarwal ............. G06F 11/3624 717/124 |
| 2013/0167129 A1* | 6/2013 | Emani ...................... G06F 8/45 717/151 |
| 2017/0046694 A1 | 2/2017 | Chow et al. |
| 2018/0189112 A1 | 7/2018 | Bequet et al. |
| 2018/0329738 A1 | 11/2018 | Kasha et al. |
| 2019/0080407 A1 | 3/2019 | Molinari et al. |
| 2019/0391967 A1 | 12/2019 | Sisk et al. |
| 2020/0110589 A1 | 4/2020 | Bequet et al. |
| 2021/0042659 A1 | 2/2021 | Chu et al. |
| 2021/0232989 A1 | 7/2021 | Rana et al. |
| 2022/0044163 A1 | 2/2022 | Caligor |
| 2023/0028538 A1 | 1/2023 | Rao et al. |

* cited by examiner

| ID Pattern | Purpose in Hierarchy or Organization |
|---|---|
| CD0000# | CD starts Code-Directory-ID in Team's Automation Repository |
| NF0000# | NF starts Nested-File-ID Located inside in the Code-Dir or sub-Dir |
| T0000# | T is the task number added inside the file. Is NOT persistent. |
| SF0000# | SF starts Standalone-File-ID in Base Directory of the Code Repo |
| T0000# | T is the task number added inside the file. Is NOT persistent. |

| Example Aggregate Signpost String added to a Task Line in an Automation Code File | Type of Nesting |
|---|---|
| CD0044-... | File/Dir Nesting in Code Repo |
| CD0044-NF0543-... | |
| CD0044-NF0543-T00099 | Line/Task in File |
| SF0002-... | File in Code Repo |
| SF0002-T00123 | Line/Task in File |

FIG. 3

| ID Pattern | Purpose in Hierarchy or Organization |
|---|---|
| BU0000# | BU starts Business-Unit-ID |
| AP0000# | AP starts Application-ID nested in parent BU |
| PJ0000# | PJ starts Project-ID nested in parent BU-AP |
| RX0000# | RX starts Repo-ID nested in parent BU-AP-PX |
| CD0000# | CD starts Code-Directory-ID nested in parent BU-AP-PX-RX |
| NF0000# | NF starts Nested-File-ID nested in parent BU-AP-PX-RX-DR |
| T0000# | T is the task number added inside the file. Is NOT persistent. |
| SF0000# | SF starts Standalone-File-ID nested in parent BU-AP-PX-RX |
| T0000# | T is the task number added inside the file. Is NOT persistent. |

400 / 402

| Example Aggregate Signpost String added to a Task Line in an Automation Code File | Type of Nesting |
|---|---|
| BU0123-... | Abstract |
| BU0123-AP0050-... | Organizational |
| BU0123-AP0050-PJ0008-... | Nesting or |
| BU0123-AP0050-PJ0008-RX0011-... | Sub-Groupings |
| BU0123-AP0050-PJ0008-RX0011-CD0044-... | File/Dir Nesting |
| BU0123-AP0050-PJ0008-RX0011-CD0044-NF0543 | in Code Repo |
| BU0123-AP0050-PJ0008-RX0011-CD0044-NF0543-T00099 | Line/Task in File |
| BU0123-AP0050-PJ0008-RX0011-SF0002 | File/Dir Nesting in |
| BU0123-AP0050-PJ0008-RX0011-SF0002-T00123 | Code Repo Line/Task in File |

| Example Aggregate Signpost String added to a Task Line in an Automation Code File | Type of Nesting |
|---|---|
| BU0123-... <br> BU0123-AP0050-... <br> BU0123-AP0050-PJ0008-... <br> BU0123-AP0050-PJ0008-RX0011-... | Abstract Organizational Nesting or Sub-Groupings |
| BU0123-AP0050-PJ0008-RX0011-CD0044-... <br> BU0123-AP0050-PJ0008-RX0011-CD0044-NF0543 <br> BU0123-AP0050-PJ0008-RX0011-CD0044-NF0543-T00099 | File/Dir Nesting in Code Repo Line/Task in File |
| BU0123-AP0050-PJ0008-RX0011-SF0002 <br> BU0123-AP0050-PJ0008-RX0011-SF0002-T00123 | File/Dir Nesting in Code Repo Line/Task in File |

Replace Above String(s) with Hexadecimal Alias (e.g., 61b1a4a8) 500

FIG. 5

UNIQUE SIGNPOST STRINGS FOR AUTOMATION TASK NAMES TO DIRECTLY CORRELATE TASK OUTPUTS TO SPECIFIC FILES AND ORIGINATING LINES OF SOURCE CODE

TECHNICAL FIELD

The present disclosure relates to data processing-software development and, more particularly, to machines and processes for tools for testing and debugging software with respect to IT automation scripts and job outputs.

DESCRIPTION OF THE RELATED ART

Output from continuous integration and continuous delivery (CI/CD) automation jobs is often vague when it comes to identifying which of the many modular automation script files generated a specific event or failure message in the job output.

The challenge is compounded by how CI/CD automation jobs are assembled during execution from many modular automation files in an automation script repository. This makes it quite difficult to pinpoint which file in the automation repository produced a specific task or event in the job output.

Frequently, people executing automation scripts jobs execute a job that fails or encounters a problem that requires escalation to the automation-script author or other knowledgeable person to diagnose the failure or understand the output. When the author looks at the job log, they often find that the output it is too vague or generic to correlate a line of output to a specific line of an automation script in a specific file. For example, the error message upon failure may simply be "Job X has failed." Some additional information may be provided, but nowhere near enough to troubleshoot the error.

When this happens, the automation author then has to ask that the job be rerun with increased output verbosity. For example, support may say "Sorry the log is too vague—please rerun the job with verbosity level 2 (or higher) and sent us the new log." This means valuable time is frequently lost waiting for the job to be executed again. Additional time may be lost if the automation author or deployment engineer is unavailable to analyze the failure logs or rerun jobs with increased verbosity.

One prior art attempt to address this problem is for companies to execute all automation script jobs at a high-level of verbosity. This still does not solve the problem, but it is an improvement on jobs executed with little or no verbosity output. But even this prior-art approach is unworkable for companies running many jobs. For example, some companies are running millions of automations a day. Implementing higher verbosity output for all automation jobs comes at an unreasonable storage cost in view of the magnitude of memory required to warehouse the results even for short periods of time.

Hence there is a long felt and unsatisfied need to provide unique identifiers (e.g., "signposts") that can be used to identify the unique location of an automation task within a multifile structure of modular automation code that is unique within the context of the automation-job code. This is especially useful when implemented in the context of code used for automation of software, application, and configuration deployments.

SUMMARY OF THE INVENTION

In accordance with one or more arrangements of the non-limiting sample disclosures contained herein, solutions are provided to address one or more of the shortcomings in the field of software development and, more particularly, for tools for testing and debugging software with respect to IT automation scripts and job outputs, by utilizing code signposts to allow for precise and unambiguous identification relating to specific lines of code and output. This is because lines of automation output are correlated with lines of automation code. Integration of a signposts tool in an automation script authoring process, and leveraging signposts during execution, escalation, and support of automation jobs makes understanding and supporting automation jobs significantly easier. Adding unique identifiers (signposts) that can be used to identify the unique location of an automation task within a multi-file structure of modular automation code is unique within the context of automation job code. Implementing this idea saves time when troubleshooting, validating, testing, and discussing automation jobs and IT automation scripts.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, automation script output is transformed such that every task in an automation includes a unique string (i.e., a "signpost") in the task name that identifies the modular automation file and specific section that produced the output. As explained in more detailed herein, any type of unique identifier may be used. this could be a string, a hexadecimal alias, or other suitable pointer, identifier, or unique reference. What is preferable is that the identifier be unique within the job such that the applicable portion of code or a task that is causing a fault can be immediately identified.

In some arrangements, this includes a tool for managing, adding, removing, cataloging signposts in scripts. Signpost management tools can include a set of scripts that add, remove, and catalog unique/searchable strings or signposts to every task in a repository full of modular CI/CD automation script files.

In some arrangements, this includes a process for using signposts to facilitate understanding of automation job output and a process to correlate job output to specific lines of specific automation script files.

In some arrangements, unique signpost strings inside the task name attributes in the code can be added. Signposts added to task name attributes do not change function of code. Task name attributes by themselves can announce a task before its results and then identify the specific code file and line of code that is being executed.

In some arrangements, the signposts added to the scripts are unique to each file in a given automation script repository.

In some arrangements, the signposts in a particular file consist of a file-identifier string that is persistent, combined with a task-identifier string that numbers the tasks in that file sequentially.

In some arrangements, an additional benefit of the format of the signpost strings can be that they contain no whitespace characters. This makes the signpost strings more broadly usable for searching in the scripts or in job output. This is because, for example, search tools in web/browser-based-interfaces treat strings with whitespaces as multiple terms connected by a logical AND, which results in loose matches that are not always useful compared with the exact matches obtained for a contiguous string with no whitespaces.

In some arrangements, an automation method of utilizing signposts assigned to automation tasks in order to correlate automation output with lines of automation source code can comprise the steps of: loading, by a first machine, at least one job automation file; identifying, by the first machine, job tasks in said at least one job automation file; assigning, by the first machine to said job tasks, unique identifiers to uniquely identify each of said job tasks in said at least one job automation file; inserting, by the first machine in said at least one job automation file, the unique identifiers; storing, by the first machine in first persistent memory, said at least one job automation file as well as a correlation file containing said unique identifiers and indicia for said job tasks that correspond thereto; executing, by a second machine, said job tasks in said at least one job automation file; detecting, by the second machine during execution of said at least one job automation file, a job failure; generating, by the second machine in response to execution of said at least one job automation file, an output log that identifies one of said unique identifiers that corresponds to one of said job tasks that resulted in the failure; storing, by the second machine in second persistent memory, the output log; and transmitting, by the second machine to a third machine for troubleshooting, the output log with the one of said unique identifiers.

In some arrangements, the unique identifiers are unique identifier strings. They may contain, inter alia, a code directory identifier, a nested file identifier, and/or a task number. They may additionally or alternatively contain standalone file identifier and a task number. Or a shorted alias, such as a hexadecimal alias, may be used to minimize the length of the signpost in the code. A lookup table or the like may be stored separately to enable the alias to be correlated with the full identifier string.

In some arrangements, existing signposts in job automation files may be removed prior to assigning new signposts or updating signposts in the files.

In some arrangements, correlation files or data may be stored as a flat file, in a database, or other storage in the same or different repository or directory/subdirectory as desired.

In some arrangements, an automation method of utilizing signposts assigned to automation tasks in order to correlate automation output with lines of automation source code can comprise the steps of: identifying, by a first machine, job automation files to be processed; loading, by a first machine, said job automation files to be processed; identifying, by the first machine, job tasks in said job automation files; assigning, by the first machine to said job tasks, unique identifiers to uniquely identify each of said job tasks in said job automation files; inserting, by the first machine in the job automation files, the unique identifiers; storing, by the first machine in first persistent memory, the job automation files as well as a correlation file containing said unique identifiers and indicia for said job tasks that correspond thereto; executing, by a second machine, said job tasks in said job automation files; detecting, by the second machine during execution of said job automation files, a job failure; generating, by the second machine in response to execution of said job automation files, an output log that identifies one of said unique identifiers that corresponds to one of said job tasks that resulted in the failure; storing, by the second machine in second persistent memory, the output log; and transmitting, by the second machine to a third machine for troubleshooting, the output log with the one of said unique identifiers.

In some arrangements, job automation files are manually selected or automatically identified based on search criteria received as an input. The search criteria can specify one or more files, directories, and/or subdirectories. Wildcards may be used as well.

In some arrangements, job automation files are identified based on detection of which of files have been modified or changed. Thus, updating or processing may be limited to these files if desired.

In some arrangements, processing may occur automatically upon commitment of a job file to a repository.

In some arrangements, an automation method of utilizing signposts assigned to automation tasks in order to correlate automation output with lines of automation source code can comprise the steps of: identifying, by a first machine, job automation files to be processed, said identifying based on user job designation, repository commitment, file change metadata, or user search criteria; removing, by the first computer, any existing signposts in said job automation files; loading, by a first machine, said job automation files to be processed; identifying, by the first machine, job tasks in said job automation files; assigning, by the first machine to said job tasks, unique identifier strings to uniquely identify each of said job tasks in said job automation files, said unique identifier strings including a task number as well as a code directory identifier, a nested file identifier, and/or a standalone file identifier, said unique identifier strings only containing non-whitespace characters; inserting, by the first machine in said job automation files, the unique identifier strings; storing, by the first machine in first persistent memory, said job automation files as well as correlation data containing said unique identifier strings and indicia for said job tasks that correspond thereto; executing, by a second machine, said job tasks in said job automation files; detecting, by the second machine during execution of said job automation files, a job failure; generating, by the second machine in response to execution of said job automation files, an output log that identifies one of said unique identifier strings that corresponds to one of said job tasks that resulted in the failure; storing, by the second machine in second persistent memory, the output log; and transmitting, by the second machine to a third machine for troubleshooting, the output log with the one of said unique identifiers.

In some arrangements, one or more various steps of processes disclosed herein can be implemented in whole or in part as computer-executable instructions stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 3 shows sample unique identifier strings that can be utilized in accordance with one or more aspects of this disclosure as they relate to unique signposts for automation task names that correlate job output to originating source code.

FIG. 4 shows additional, sample, unique identifier strings that can be utilized in accordance with one or more aspects of this disclosure as they relate to unique signposts for automation task names that correlate job output to originating source code.

FIG. 5 shows a sample hexadecimal alias used in place of unique identifier strings that can be utilized in accordance with one or more aspects of this disclosure as they relate to unique signposts for automation task names that correlate job output to originating source code.

DETAILED DESCRIPTION

Figure 1:
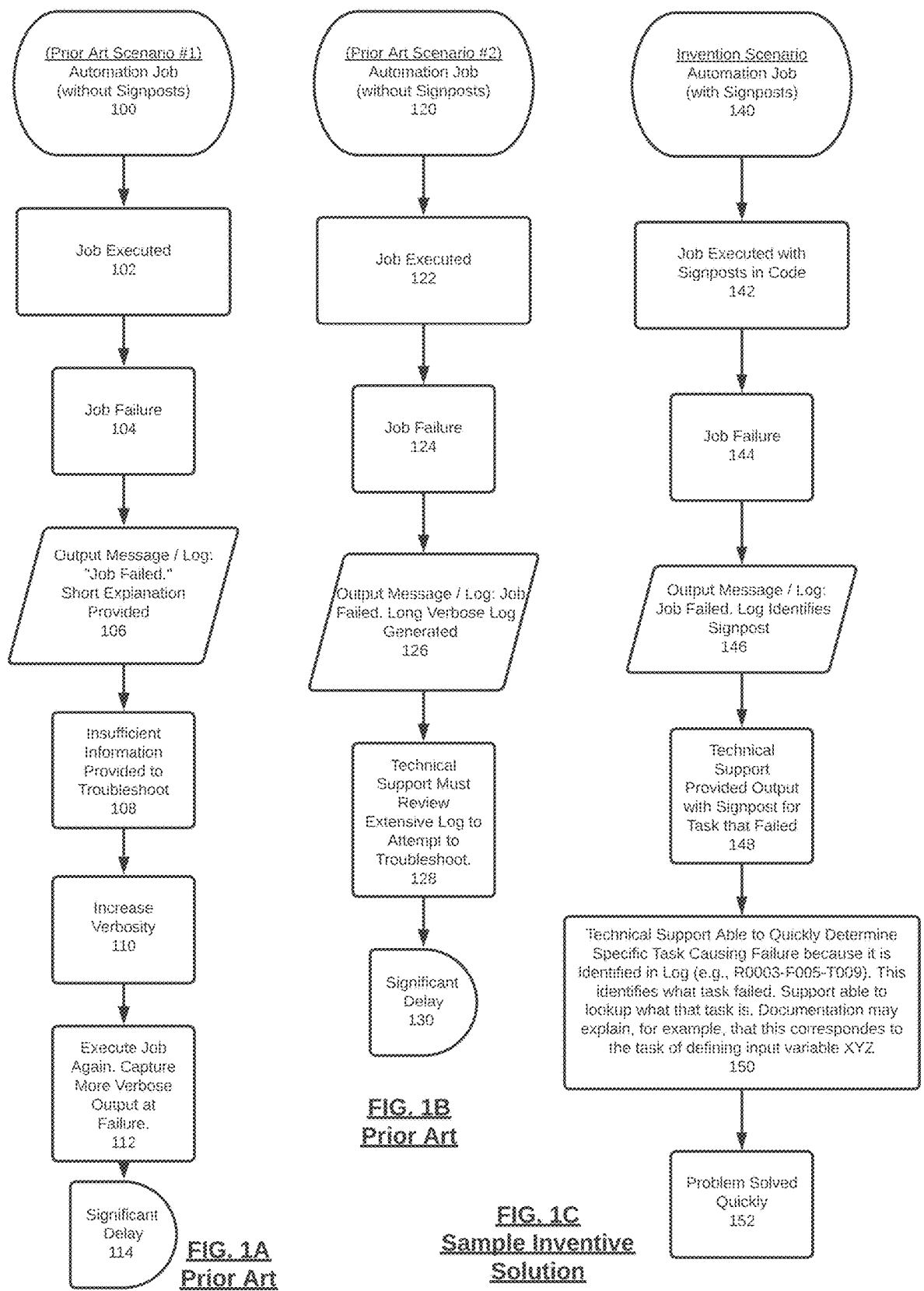
FIGS. 1A and 1B depicts prior-art scenarios demonstrating the troubleshooting and debugging problems associated with traditional automation task faults.
FIG. 1C illustrates a sample scenario contrasting one aspect of the inventive approach with the prior-art scenarios in accordance with one or more aspects of this disclosure as they relate to unique signposts for automation task names to correlate output to originating source code.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

For reference, FIGS. 1A and 1B depicts prior art scenarios demonstrating the troubleshooting and debugging problems associated with automation task faults.

In the first prior-art scenario, an automation job is prepared, and signposts are not included in the originating source code 100. The job is then executed 102. The job suffers a failure or fault 104, and then an output message is displayed, or a log is generated, which provides a short explanation as to why the job failed 106. In this setup, insufficient information is provided in the output message, or in the log explanation, in order to troubleshoot why the job failed 108. Accordingly, the job must be performed again. This time verbosity of the output must be increased 110. The job is then executed again, and the output is captured with more verbosity at the time of failure 112. This results in significant delay 114, and still makes it difficult to troubleshoot what the problem is, and technicians or support personnel must still wade through all of the verbose output in an attempt to discern the cause of the problem. A skilled artisan will understand all of the problems associated with this prior-art scenario.

In the second prior-art scenario, an automation job is prepared, and signposts are again not included in the originating source code 120. The job is then executed 122. The job suffers a failure or fault 124, and then an output message is displayed, or a log is generated, which provides a long explanation or verbose output as to the entirety of the job or why the job failed 126. Technical support must again review an extensive verbose log and attempt to troubleshoot the problem and has to wade through an immense amount of data to try to locate the issue 128. Again, this results in significant delay 130. Once again, a skilled artisan will understand all of the problems associated with this prior-art scenario.

By way of non-limiting disclosure, FIG. 1C illustrates a sample scenario contrasting the invention approach with the prior-art scenarios of FIGS. 1A and 1B. In accordance with one or more aspects of this disclosure as they relate to unique signposts for automation task names to correlate output to originating source code, an automation job is prepared with signposts embedded in the source code for each job task contained therein 140. The job is executed with signposts in the code 142 and results in a job failure 144. An output message or log is generated indicating that the job failed however, in this example of the invention, the output in the message and/or the log identifies the signpost at which the failure occurred 146. Technical support can then be provided with output information that includes the signpost, which identifies the task that failed one for eight. Technical support is then able to quickly determine the specific task that caused the failure, because the signpost corresponding to the task is (1) embedded in the originating source code and (2) identified in the output. Support is there an able to look up what that task code is and identify the source code to which the sign postcode corresponds. Support can then utilize documentation or other resources, for example, to look up what the code is and then determine that it corresponds to a particular task, such as, for example, defining an input variable XYZ 150. This allows the problem to be resolved quickly 152. In some ways, it is analogous to an engine code being identified when a check engine light is activated on an automobile. The code tells the technician where to look or what the problem might be.

"Signposts" are unique strings that can be added to the name attributes for each code tasks in IT Automation Script repositories by executing a signpost tool (either manual or automatic). The Signpost strings are a combination of a directory-hierarchy-identity and file-identity string that get assigned and stored persistently (preferably) and task numbers that count up from T001 to T999 (or larger if needed). Examples: R0011-F002-T033, P004-T005. If the targeted code file or its parent directory already has an identity in the signpost datastore—then the existing identity values are re-used for the file, or next available number is used. Tasks inside a file can be renumbered sequentially . . . -T001 thru Tnnn. Examples could be: P###-T### refers to a playbook file P00# and tasks T001-Tnnn inside; P#### is a persistent playbook file-ID; P001-P999 inside a repo at root level; R####-F###-T### refers to a role directory R00#, file F00# nested in parent that role, and task T00# inside that file; R#### is a persistent role-directory-ID (our roles a very numerous); and F### is a persistent file-ID inside a role; F001-F999 nested in parent a role.

Figure 2:
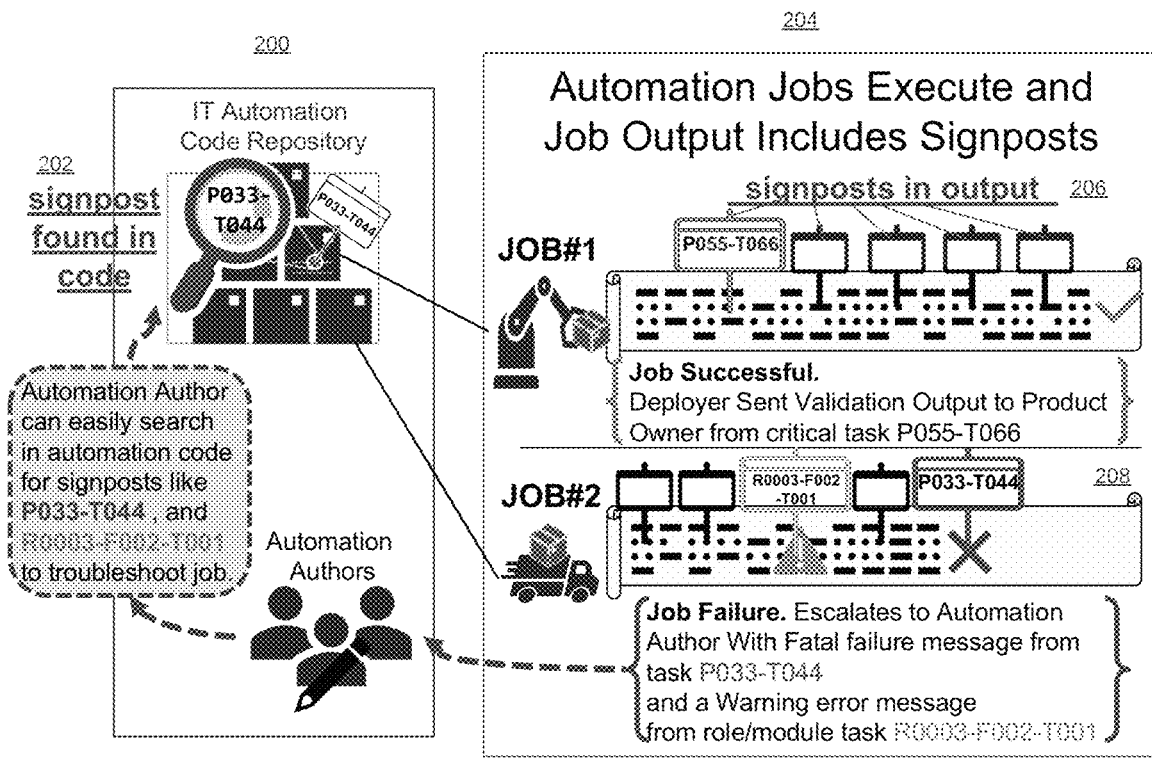
FIG. 2 depicts a sample implementation of unique signposts for automation task names to correlate output to originating source code.

By way of non-limiting disclosure, FIG. 2 depicts a sample implementation of unique signposts for automation task names to correlate output to originating source code. An IT automation code repository or other storage means for automation jobs can be provided 200. Signposts may be manually or automatically added to source code 202. A separate unique signpost is added next to each task or task name in source code for the automation job.

Automation jobs may then be executed with the signposts embedded in the source code and the job output (whether in the form of message(s), log(s), or the like, etc.) will then also have signposts 204 included therein. Signposts in the output 206 are useful when jobs, like Job #1, are successfully executed. For example, a developer may be sent validation output to a product order from a critical task (e.g., P055-T066 as shown in the example in the figure). Signposts in the output 208 are even more useful when jobs, like Job #2, encounter a fault or fail during execution. This allows fast escalation to an automation author with the fatal failure message from the particular task that failed P033-T044 and a warning error message from a role/module task R0003-F002-T001.

By way of non-limiting disclosure, FIG. 3 shows sample unique identifier strings that can be utilized in accordance with one or more aspects of this disclosure as they relate to unique signposts for automation task names that correlate job output to originating source code. As depicted in the examples of this figure, various ID patterns 300 can be utilized and can have a specific purpose in a hierarchy or organization 302. Corresponding examples 304 aggregating the signpost string added to a task line in an automation code file are provided and the type(s) of nest 306 are identified as well. In some situations, an index or catalog of IDs assigned to folders and files can be kept locally in the same repository as flat text files.

As depicted in FIG. 3 examples, ID Patterns 300 could include: CD0000#, NF0000#, and T0000#; or SF0000# and T0000#. The respective purposes in the hierarchy or organization 302 could be: CD starts Code-Directory-ID in Team's Automation Repository, NF starts Nested-File-ID Located inside in the Code-Dir or sub-Dir, T is the task number added inside the file (and preferably is not persistent such that task numbers can be reused). SF starts Standalone-File-ID in Base Directory of the Code Repo and T is again the task number added inside the file (and preferably is not persistent such that task numbers can be reused).

Example aggregate signpost strings added to task lines in an automation code file 304 could respectively be: CD0044-...; CD0044-NF0543-...; CD0044-NF0543-T00099; SF0002-...; and SF0002-T00123. The respective types of nesting 306 could then be: File/Dir Nesting in Code Repo-Line/Task in File; File in Code Repo-Line/Task in File. By way of non-limiting disclosure, FIG. 4 shows another sample unique identifier strings that can be utilized in accordance with one or more aspects of this disclosure as they relate to unique signposts for automation task names that correlate job output to originating source code. As depicted in the examples of this figure, various ID patterns 400 can be utilized and can have a specific purpose in a hierarchy or organization 402. Corresponding examples 404 aggregating the signpost string added to a task line in an automation code file are provided and the type(s) of nest 406 are identified as well. In some aspects, an index or catalog of IDs assigned at all layers are stored in a database.

As depicted in FIG. 4 examples, ID Patterns 400 could include: BU0000#; AP0000#; PJ0000#; RX0000#; CD0000#; NF0000#; T0000#; SF0000#; and T0000#. The respective purposes in the hierarchy or organization 402 could be: BU starts Business-Unit-ID; AP starts Application-ID nested in parent BU; PJ starts Project-ID nested in parent BU-; RX starts Repo-ID nested in parent BU-AP-PX; CD starts Code-Directory-ID nested in parent BU-AP-PX-RX; NF starts Nested-File-ID nested in parent BU-AP-PX-RX-DR; T is the task number added inside the file. SF starts Standalone-File-ID nested in parent BU-AP-PX-RX and T is the task number added inside the file.

Example aggregate signpost strings added to task lines in an automation code file 304 could respectively be: BU0123-...; BU0123-AP0050-...; BU0123-AP0050-PJ0008-...; BU0123-AP0050-PJ0008-RX0011-...; BU0123-AP0050-PJ0008-RX0011-CD0044-...; BU0123-AP0050-PJ0008-RX0011-CD0044-NF0543; BU0123-AP0050-PJ0008-RX0011-CD0044-NF0543-T00099; BU0123-AP0050-PJ0008-RX0011-SF0002; BU0123-AP0050-PJ0008-RX0011-SF0002-T00123.

Respective types of nesting 406 can be: Abstract Organizational Nesting or Sub-Groupings; File/Dir Nesting in Code Repo-Line/Task in File; and File/Dir Nesting in Code Repo-Line/Task in File.

By way of non-limiting disclosure, FIG. 5 shows a sample hexadecimal alias used in place of unique identifier strings that can be utilized in accordance with one or more aspects of this disclosure as they relate to unique signposts for automation task names that correlate job output to originating source code. Short, unique hex-strings can be assigned as an alias to replace a long and complicated string and to enhance readability of the output.

The long signpost string identified in FIG. 5 can be replaced with short alias string(s). As an example, in code text files, "BU0123-AP0050-PJ0008-RX0011-" can be replaced by just "61b1a4a8-". So, the depicted signpost strings could be shortened from BU0123-AP0050-PJ0008-RX0011-CD0044-NF0543-T00099 to 61b1a4a8-CD0044-NF0543-T00099; and from BU0123-AP0050-PJ0008-RX0011-SF0002-T00123 to 61b1a4a8-SF0002-T0012.

Figure 6:
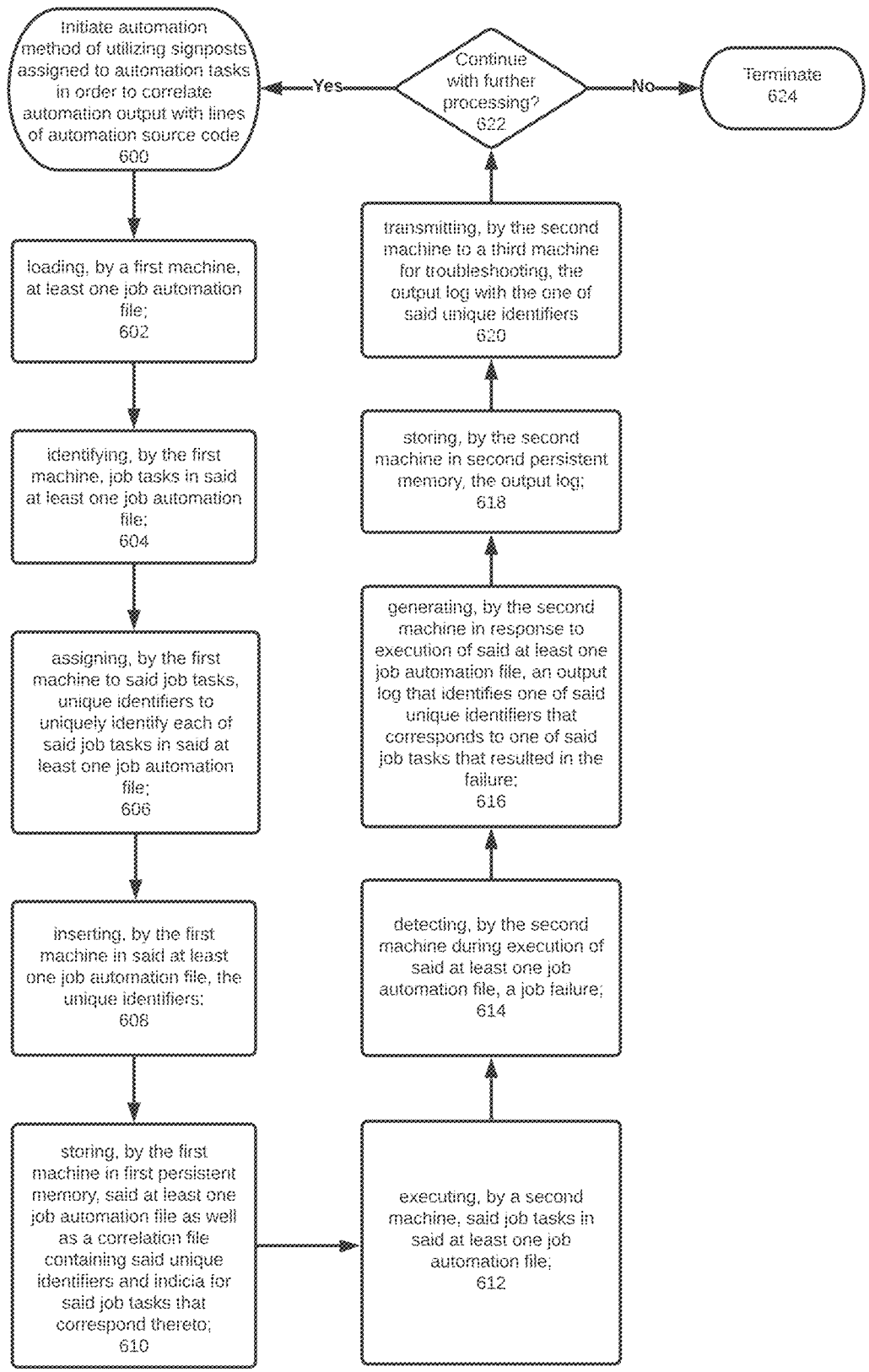
FIGS. 6-8 depict sample functional, flow diagrams showing example implementations, interactions, interfaces, steps, functions, and components that can be utilized in accordance with one or more aspects of this disclosure as they relate to unique signposts for automation task names that correlate job output to originating source code.
Figure 7:
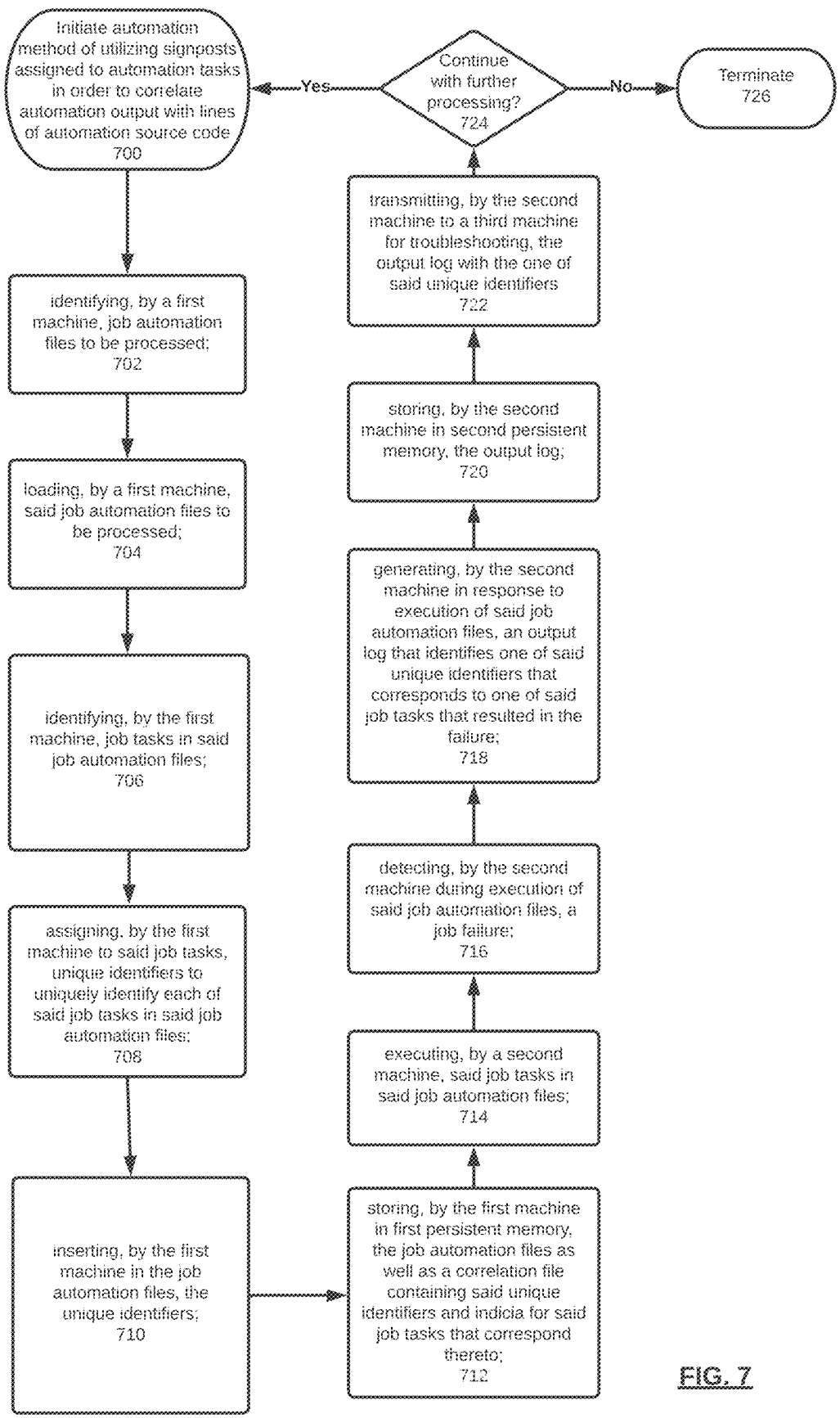
Figure 8:
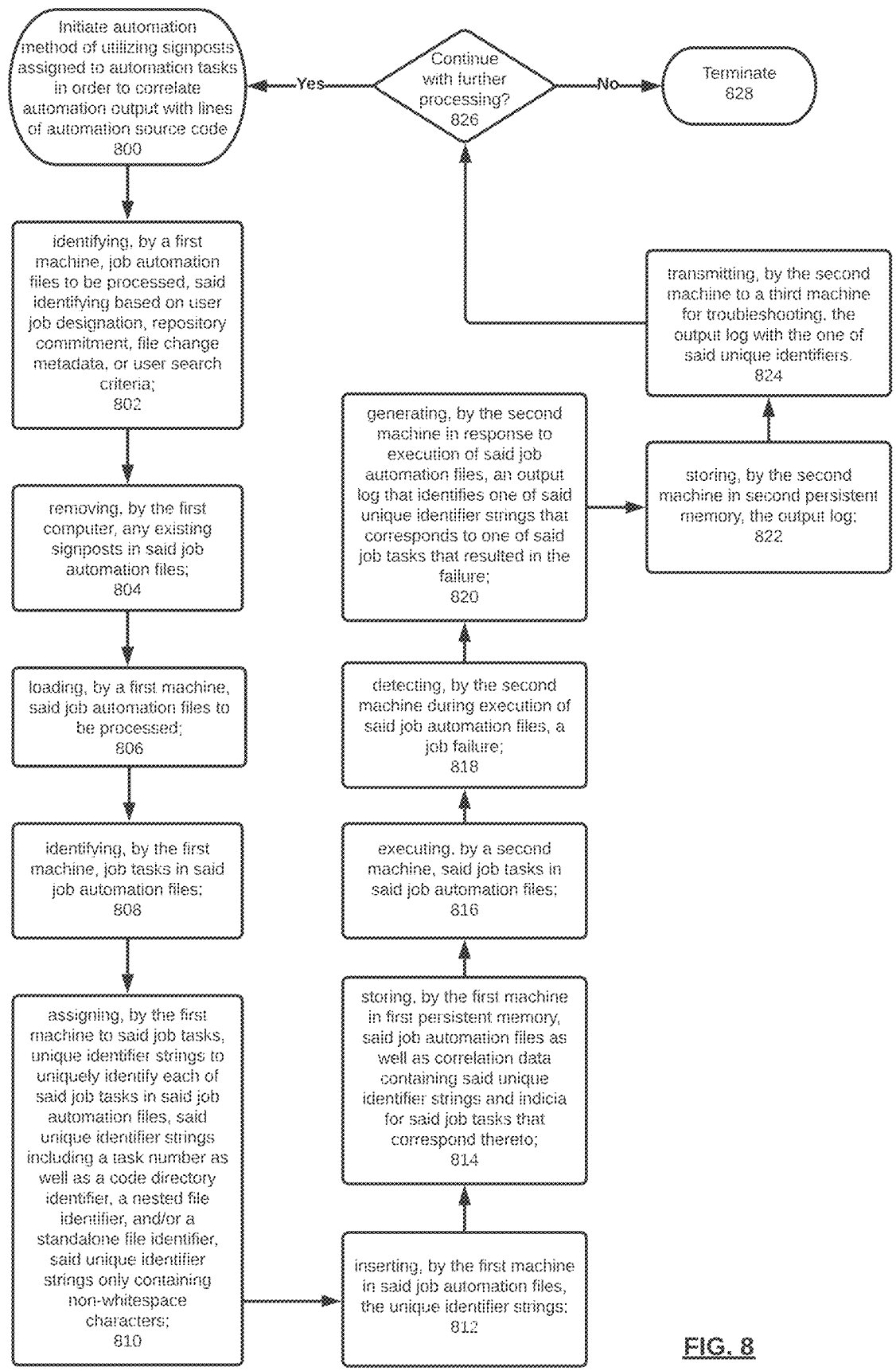

By way of non-limiting disclosure, FIGS. 6-8 depict sample functional, flow diagrams showing example implementations, interactions, interfaces, steps, functions, and components that can be utilized in accordance with one or more aspects of this disclosure as they relate to unique signposts for automation task names that correlate job output to originating source code.

In FIG. 6, an automation method of utilizing signposts assigned to automation tasks in order to correlate automation output with lines of automation source code can be initiated in 600. In 602, loading, by a first machine, of at least one job automation file is performed. In 604, identifying, by the first machine, job tasks in said at least one job automation file is ascertained. In 606, assigning, by the first machine to said job tasks, unique identifiers to uniquely identify each of said job tasks in said at least one job automation file is executed. In 608, inserting, by the first machine in said at least one job automation file, the unique identifiers is completed. In 610, storing, by the first machine in first persistent memory, said at least one job automation file as well as a correlation file containing said unique identifiers and indicia for said job tasks that correspond thereto is implemented. In 612, executing, by a second machine, said job tasks in said at least one job automation file is performed. In 614, detecting, by the second machine during execution of said at least one job automation file, a job failure. In 616, generating, by the second machine in response to execution of said at least one job automation file, an output log that identifies one of said unique identifiers that corresponds to one of said job tasks that resulted in the failure is accomplished. In 618, storing, by the second machine in second persistent memory, the output log is completed. In 620, transmitting, by the second machine to a third machine for troubleshooting, the output log with the one of said unique identifiers is performed. Further processing may be performed 622 if desired or the process may conclude 624.

In FIG. 7, another sample automation method 700 of utilizing signposts assigned to automation tasks in order to correlate automation output with lines of automation source code can comprise the steps of: identifying 702, by a first machine, job automation files to be processed; loading 704, by a first machine, said job automation files to be processed; identifying 706, by the first machine, job tasks in said job automation files; assigning 708, by the first machine to said job tasks, unique identifiers to uniquely identify each of said job tasks in said job automation files; inserting 710, by the first machine in the job automation files, the unique identifiers; storing 712, by the first machine in first persistent memory, the job automation files as well as a correlation file containing said unique identifiers and indicia for said job tasks that correspond thereto; executing 714, by a second machine, said job tasks in said job automation files; detecting 716, by the second machine during execution of said job automation files, a job failure; generating 718, by the second machine in response to execution of said job automation files, an output log that identifies one of said unique identifiers that corresponds to one of said job tasks that resulted in the failure; storing 720, by the second machine in second persistent memory, the output log; and transmitting 722, by the second machine to a third machine for troubleshooting, the output log with the one of said unique identifiers. Further processing may be performed 724 if desired or the process may conclude 726.

In FIG. 8, yet another automation 800 method of utilizing signposts assigned to automation tasks in order to correlate automation output with lines of automation source code can comprise the steps of: identifying 802, by a first machine, job automation files to be processed, said identifying based on user job designation, repository commitment, file change metadata, or user search criteria; removing 804, by the first computer, any existing signposts in said job automation files; loading 806, by a first machine, said job automation files to be processed; identifying 808, by the first machine, job tasks in said job automation files; assigning 810, by the first machine to said job tasks, unique identifier strings to uniquely identify each of said job tasks in said job automation files, said unique identifier strings including a task number as well as a code directory identifier, a nested file identifier, and/or a standalone file identifier, said unique identifier strings only containing non-whitespace characters; inserting, by the first machine in said job automation files, the unique identifier strings; storing 812, by the first machine in first persistent memory, said job automation files as well as correlation data containing said unique identifier strings and indicia for said job tasks that correspond thereto; executing 816, by a second machine, said job tasks in said job automation files; detecting, by the second machine during execution of said job automation files, a job failure; generating 820, by the second machine in response to execution of said job automation files, an output log that identifies one of said unique identifier strings that corresponds to one of said job tasks that resulted in the failure; storing 822, by the second machine in second persistent memory, the output log; and transmitting 824, by the second machine to a third machine for troubleshooting, the output log with the one of said unique identifiers. Further processing may be performed 826 if desired or the process may conclude 828.

In any of the foregoing, job automation files can be manually selected or automatically identified based on search criteria received as an input. The search criteria can specify one or more files, directories, and/or subdirectories. Wildcards may be used as well.

Job automation files can also be identified based on detection of which of files have been modified or changed. Thus, updating or processing could be limited to these files if desired.

Automatic processing and insertion of signpost may occur automatically upon commitment of a job file to a source code repository if desired.

It should be understood that implementation of signposts can be accomplished manually through the use of a signpost tool or automatically by automation job processing.

On one version, a Blanket Mode can remove all existing signposts from automation code/script files, and then add all new signposts, with freshly enumerated IDs. This can be implemented in a single SCM code repository. The signpost tool can be stored in the same repository. Signposts can be applied in a blanket approach to all *task-name-attribute lines in all ** files that match a configured path/filename glob or regex pattern in the automation in the code repository. Signpost indexes can be recorded in flat files in same repositories. The Signpost Tool can save the signpost identifier strings that are assigned to specific roles, files, and folders, . . . etc., in flat-file catalog or index files to in the automation code repository hierarchy. This provides persistence and consistency in the existing signposts across multiple cycles and automation code releases. The catalog can be the index text files of existing signposts maintained by the tool as flat files in same repository.

In another version, a Targeted Mode can target specified directories and files in the code repository, focusing on files/directories specified by the author that is executing the tool. This can be accomplished by manual selection of files/directories, search queries to select the files, or other automated means of selection or identification. This can include adding signposts to not only specific files/folders, but also to their recursive contents.

In a further version, a SCM-DIFF/Automatic Mode, the toolset can leverage SCM/GIT commands to find all changed files and update them with signposts. This adds/updates signposts in just those changed files without the author having to specify files or directories. The author can execute cmd with a switch, like: scripts/add_signposts.sh --scm-auto. Optionally, this could be configured to replace the default behavior when no command line switches are given. Additional switches could also be added to the tool like, for example, --blanket and --target {dir/file}, to allow the modes from the above-referenced versions to be executed.

In yet a further version, a SCM-Webhooks Mode, the Toolset can be integrated into SCM/GIT "check-in" or "merge" process. This allows the add-signposts step from the SCM-DIFF/Automatic Mode to be triggered automatically by SCM-webhooks that execute the Signposts add action when an author checks-in their code. An example when an author executes GIT Push or a Git Pull Request to merge changes to an SCM or GIT repository.

A database may also be used to persistently store signpost IDs, and support extended signpost IDs to accommodate enterprise hierarchy, and a multitude of project repositories belonging to different groups. Signpost hierarchical IDs can also be expanded/extended to match enterprise hierarchy, like organization-id, project-id, repo-id, folder-id, task/line-id.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An automation method of utilizing signposts assigned to automation tasks in order to correlate automation output with lines of automation source code comprising the steps of:

identifying, by a first machine, two or more job automation files containing job automation source code to be processed;

loading, by the first machine, said two or more job automation files to be processed;

processing, by the first machine said two or more job automation files by performing the steps of:

removing, by the first machine, any existing signpost in said job automation files;

identifying, by the first machine, job tasks in each respective job automation file of the two or more job automation files;

assigning, by the first machine to said identified job tasks, unique identifier strings to uniquely identify each job task in said two or more job automation files, wherein said unique identifier strings are signposts that include at least a task number and a standalone file identifier;

embedding, by the first machine, the unique identifier strings into their respective job automation file; and storing, by the first machine in first persistent memory, said two or more job automation files with embedded unique string identifiers, as well as a correlation file containing said unique identifier strings and indicia for said job tasks that correspond thereto;

executing, by a second machine, said job tasks in said two or more job automation files;

detecting, by the second machine during execution of said two or more job automation files, a job failure;

generating, by the second machine in response to execution of said two or more job automation files, an output log that identifies only said unique identifier strings that corresponds to one of said job tasks that resulted in the failure;

storing, by the second machine in second persistent memory, the output log; and transmitting, by the second machine to a third machine for troubleshooting, the output log with the said unique identifier strings that corresponds to one of said job that that resulted in the failure.

2. The automation method of claim 1 wherein each of said unique identifier strings further include a code directory identifier and a nested file identifier.

3. The automation method of claim 2 wherein each of said unique identifier strings is replaced with a hexadecimal alias.

4. The automation method of claim 1 wherein each of said unique identifier strings is replaced with a hexadecimal alias.

5. The automation method of claim 2 wherein the correlation file is a flat file.

6. The automation method of claim 2 wherein the correlation file is a database.

7. A system, comprising, one or more computing devices comprising processors and memory storing program instructions for utilizing signposts assigned to automation tasks in order to correlate automation output with lines of automation source code, wherein the program instructions, when executed on the one or more computing devices, cause the one or more computing devices to perform the steps of:

identifying, two or more job automation files containing job automation source code to be processed;

loading, said two or more job automation files to be processed;

processing, said two or more job automation files by performing the steps of:

removing, any existing signpost in said job automation files;

identifying, job tasks in each respective job automation file of the two or more job automation files;

assigning, to said identified job tasks, unique identifier strings to uniquely identify each identified job task in said two or more job automation files, wherein said unique identifier strings are signposts that include at least a task number and a standalone file identifier;

embedding, the unique identifier strings into their respective job automation file; and storing, the two or more job automation files with embedded unique identifier strings, as well as a correlation file containing said unique identifier strings, and indicia for said job tasks that correspond thereto;

executing, said job tasks in said two or more job automation files;

detecting during execution of said two or more job automation files, a job failure;

generating, in response to execution of said two or more job automation files, an output log that identifies only said unique identifier strings that corresponds to one of said job tasks that resulted in the failure;

storing, in second persistent memory, the output log; and transmitting, for troubleshooting, the output log with the one of said unique identifier strings that corresponds to one of said job tasks that resulted in the failure.

8. The system of claim 7 wherein said job automation files are identified based on search criteria received as an input.

9. The system of claim 8 wherein the search criteria specifies files, directories, and/or subdirectories.

10. The system of claim 7 wherein said job automation files are identified based on detection of which of said job automation files have been modified.

11. The system of claim 7 wherein the said job automation files are identified based on commitment of said job automation files to a code repository.

12. The system of claim 11 wherein said job automation files are identified based on detection of which of said job automation files have been modified.

13. The system of claim 12 wherein each of said unique identifier strings further include a code directory identifier and/or a nested file identifier.

14. One or more non-transitory, computer readable media storing program instructions that, when executed on or across one or more processors, cause the processors to perform the steps of:

identifying two or more job automation files containing job automation source code to be processed;

loading said two or more job automation files to be processed;

processing said two or more job automation files by performing the steps of:

removing any existing signposts in said job automation files;

identifying job tasks in each respective job automation file of the two or more job automation files;

assigning said identified job tasks, unique identifier strings to uniquely identify each identified job task in said two or more job automation files, wherein said unique identifier strings are signposts that include at least a task number and a standalone file identifier;

embedding the unique identifier string into their respective job automation file; and storing in first persistent memory, said two or more job automation files with embedded unique identifier strings, as well as a correlation file containing said unique identifier strings and indicia for said job tasks that correspond thereto;

executing said job tasks in said two or more job automation files;

detecting during execution of said two or more job automation files, a job failure;

generating in response to execution of said two or more job automation files, an output log that identifies only said unique identifier strings that corresponds to one of said job tasks that resulted in the failure;

storing in second persistent memory, the output log; and transmitting for troubleshooting, the output log with the one of said unique identifier strings that corresponds to ne of said job tasks that resulted in the failure.

15. The one or more computer readable storage media of claim 14 wherein each said unique identifier strings is a hexadecimal alias.

* * * * *